United States Patent [19]

Kenmochi et al.

[11] Patent Number: 4,657,714
[45] Date of Patent: Apr. 14, 1987

[54] METHOD AND PRESS MOLDING APPARATUS FOR FORMING INFORMATION CARRIER DISCS OF GRANULAR THERMOPLASTIC MATERIAL

[75] Inventors: Kazuei Kenmochi, Hirakata; Tadashi Sakairi, Katano; Masamitsu Miyazaki, Kadoma, all of Japan

[73] Assignee: Matsushita Electric Industrial Co., Ltd., Osaka, Japan

[21] Appl. No.: 753,575

[22] Filed: Jul. 10, 1985

[30] Foreign Application Priority Data

Jul. 11, 1984 [JP] Japan ............................. 59-143544

[51] Int. Cl.[4] ............................................ B29D 11/00
[52] U.S. Cl. .................................. 264/1.3; 264/1.4; 264/25; 264/102; 264/107; 425/174.4; 425/405 R; 425/407; 425/421; 425/810
[58] Field of Search ............... 264/1.3, 1.4, 106, 107, 264/69, 101, 322, 25; 425/405 R, 810, 407, 421, 174.4, 185, 193, 195; 156/380.9

[56] References Cited

U.S. PATENT DOCUMENTS

| | | | |
|---|---|---|---|
| 3,883,369 | 5/1975 | Badger et al. | 156/272 |
| 4,157,931 | 6/1979 | Bricot et al. | 156/230 |
| 4,315,723 | 2/1982 | Antoine et al. | 425/110 |
| 4,331,628 | 5/1982 | Ziegler | 264/553 |
| 4,472,124 | 9/1984 | Kashihara et al. | 425/3 |
| 4,518,335 | 5/1985 | Pujari | 425/78 |

OTHER PUBLICATIONS

Modern Plastics Encyclopedia, Oct. 1981, vol. 58, No. 10A, pp. 255-258, "Compression Molding".

Primary Examiner—Jan Silbaugh
Assistant Examiner—Jennifer Cabaniss
Attorney, Agent, or Firm—Wenderoth, Lind & Ponack

[57] ABSTRACT

A press molding apparatus and its method of operation for making an information carrier disc which comprises the steps of maintaining a mass of granular transparent synthetic material in a vacuum, radiating heat from an infrared heating unit to plasticize the synthetic material, and press-molding the plasticized synthetic material.

9 Claims, 6 Drawing Figures

METHOD AND PRESS MOLDING APPARATUS FOR FORMING INFORMATION CARRIER DISCS OF GRANULAR THERMOPLASTIC MATERIAL

BACKGROUND OF THE INVENTION

The present invention generally relates to the press-molding of information carrier discs such as, for example, videodiscs, digital audiodiscs, and disc memories, and more particularly to a method and an apparatus for making such information carrier discs.

A fairly long time has passed since the optical disc recording/reproducing system has been made available in the market. Information carrier discs used in association with the optical disc recording and/or reproducing system are generally made by molding a synthetic resin. In general, photographic records are manufactured by the use of a plastics extruding machine designed to soften, knead and press-mold plastic material to form disc-shaped records.

However, when it comes to the information carrier discs for use with the optical disc recording/reproducing system (which carrier discs are hereinafter referred to as "optical carrier discs"), an injection molding technique is generally used to make them because no inclusion of foreign matter is permitted and because they must have a precise flatness and a precise roundness in order for an optical pick-up to coordinate with them. FIGS. 1 and 2 of the accompanying drawings illustrate an example of the conventionally used injection molding machines and a portion of the molding cavity in the injection molding machine, respectively, reference to which will now be made for the discussion of the prior art method for the manufacture of the optical carrier discs.

Referring first to FIG. 1, the prior art injection molding machine comprises a hopper 1 for accommodating and drying a synthetic material, a plasticizing cylinder 2 having a screw conveyor built therein, a screw drive 3 for driving the screw conveyor axially of and about the longitudinal axis of the cylinder 2, heaters 4 for heating the cylinder 2, a fixed platen 5, a movable platen 6, a plurality of parallel tie bars 7, a hydraulic cylinder 8 for driving the movable platen 6 in a direction close towards and away from the fixed platen 5, a fixed mold 10 carried by the fixed platen 5, and a movable mold 11 carried by the movable platen 6 and cooperable with the fixed mold 10 to define a molding cavity 15 (FIG. 2), complemental in shape and size to the desired carrier disc, when the movable platen 6 is driven close towards the fixed platen 10 with the molds 10 and 11 clamped together. FIG. 1 shows how the synthetic material is injected and then molded in the molding cavity 15, it being noted that the fixed mold 10 has a sprue 13 defined therein in communication with the cylinder 2 and also has a molding surface 12 formed with signal grooves.

The machine shown is so designed that the synthetic material within the hopper 1 can be fed forward by the action of the screw conveyor within the cylinder 2 while being simultaneously plasticized and then injected into the molding cavity 15 through the sprue 13 and then through a gate 14 by the push of the screw conveyor to form a molded article 16 which is subsequently allowed to solidity.

The conventional manufacture of the carrier discs by the use of the injection molding machine has the following problems because the synthetic material is necessarily plasticized in order to render it to flow.

(a) Flow markings tend to appear on one or both of the opposite surfaces of the carrier disc, which often constitute a cause of generation of erroneous signals from the pick-up.

(b) Molecules are oriented in a direction generally parallel to the direction of flow of the plasticized synthetic material, constituting a cause of birefringence of light, and accordingly, an error tends to occur during the detection of a component of the laser beam reflected from the surface or surfaces of the carrier disc.

(c) Since the plasticized synthetic material is injected into the narrow molding cavity in a short time, considerably increased pressure as well as increased clamping force are required, resulting in the necessity for using an injection molding machine which is bulky in size and, hence, expensive to manufacture.

SUMMARY OF THE INVENTION

Accordingly, the present invention has been devised with a view towards substantially eliminating the above discussed problems inherent in the conventional manufacture of the information carrier discs and has for its essential object to provide a method for the manufacture of the information carrier discs which is possible with the use of a compact molding machine with the minimized possibility of inclusion of defects which would constitute a cause of generation of erroneous signals.

Another important object of the present invention is to provide an improved press-molding apparatus for the manufacture of the information carrier discs according to the method referred to above.

According to the present invention, there is provided a press-molding method wherein a transparent synthetic material is placed in a substantial vacuum or a vacuum, then plasticized by the radiation of heat from an infrared heater, and finally press-molded to provide an information carrier disc.

The present invention also provides a prss-molding apparatus which comprises a press having fixed and movable platens, a mold assembly installed in the press between the fixed and movable platens, a removable casing capable of retaining a substantial vacuum or a vacuum in its interior and adapted to be placed in a space defined in the mold assembly when the latter is opened, and a drive means and an infrared heater both provided in the casing so that the infrared heater can be selectively moved to and away from a position immediately above a molding cavity by the drive means.

According to the present invention, since the synthetic material is plasticized in a vacuum, any possible inclusion of blowholes (including those which are too minute to be visible, but would constitute obstructions to the optical information read-out) can be substantially avoided and, therefore, the accurate reproduction of information is possible from the resultant carrier disc. The fact that the information carrier disc is molded in a vacuum makes it possible to establish a closely fitted interface between the plasticized synthetic material and the signal groove with a high transfer precision achieved.

Separation of the resultant carrier disc from the mold (i.e., templet in the embodiment so far shown and described) is carried out also in a vacuum. Therefore, not only can it be readily achieved without being adversely affected by the atmospheric pressure which would act to urge the resultant carrier disc, but also any possible damage to the signal groove transferred onto the resultant carrier disc can be minimized. In other words, with the method and apparatus of the present invention, the precise transfer of the signal groove is achieved and, because any possible damage to the mold is minimized, the mold can be repeatedly used for an extended period of time.

Moreover, since the transparent synthetic material is heated by the infrared heater while placed in the mold, the apparatus as a whole can be assembled in a compact size without the necessity of using a machine element such as an extruder generally used in the conventional phonograph record making press and a screw-type plasticizer used in the conventional disc making injecting molding machine.

Also, since in plasticizing the transparent synthetic material, heat energizes are transmitted to the synthetic material in a vacuum by radiation of the infrared heater, there is no possibility that the plasticized synthetic material may be contaminated with foreign matter (such as, for example, dust in the air, fragments of one or more structural elements, for example, a screw, which would be a product of frictional wear, and/or coagulated resin particles, oxides of additives, products of chemical decomposition which would be found in the screw feeder. Therefore, it is possible to manufacture the information carrier disc which would not constitute a cause of erroneous signal recording and/or reproduction.

Furthermore, since the molding to provide the information carrier disc is carried out without allowing the transparent synthetic resin to fluidize within the narrow molding cavity, there is no substantial possibility that the molecules would be so oriented as to eventually result in the birefringence of light in the resultant carrier disc which would constitute a cause of erroneous signal reading. The use of a minimized molding pressure and, hence, a minimized clamping force, is possible, resulting in the possibility that the apparatus can be manufactured at reduced cost in compact size. In addition, because of the reason described above, the resultant carrier disc is free from any flow markings.

BRIEF DESCRIPTION OF THE DRAWINGS

These and other objects and features of the present invention will become clear from the following description taken in conjunction with a preferred embodiment thereof with reference to the accompanying drawings, in which.

DETAILED DESCRIPTION OF THE EMBODIMENT

Figure 1:
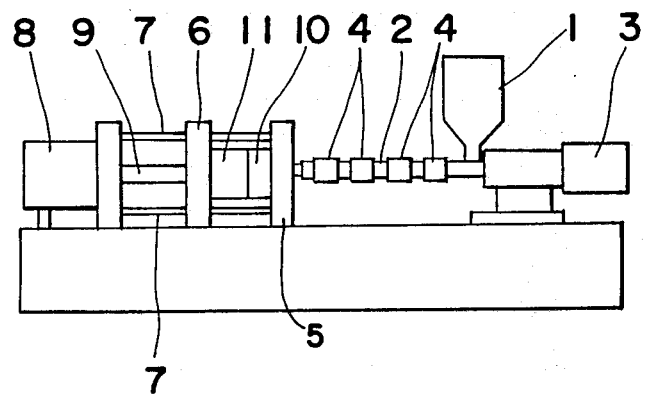
FIG. 1 is a schematic side view of the injection molding machine used to practice the prior art disc molding method.
Figure 2:
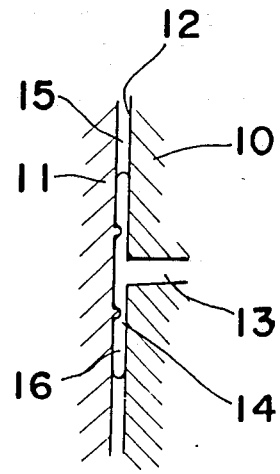
FIG. 2 is a sectional view, on an enlarged scale, of a molding assembly in the injection molding machine shown in FIG. 1.

Before the description of the present invention proceeds, it is to be noted that like parts are designated by like reference numerals throughout the accompanying drawings, except for FIGS. 1 and 2.

Figure 3:
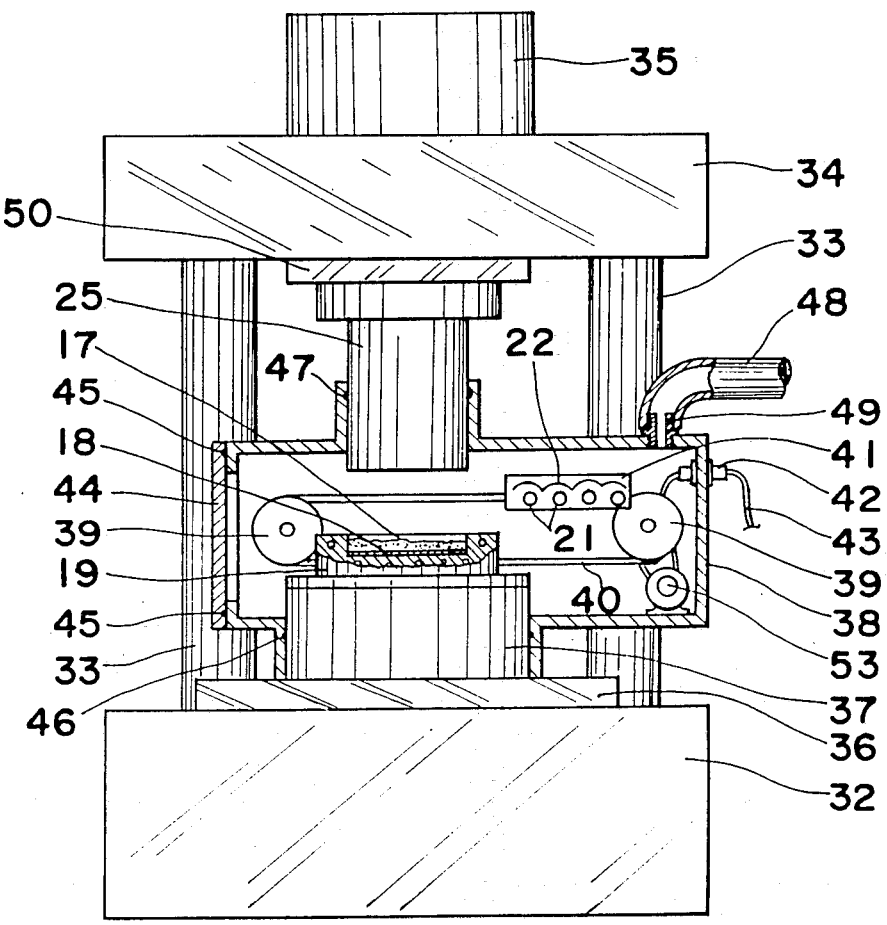
FIG. 3 is a longitudinal sectional view of a press-molding apparatus embodying the present invention.

Referring not to FIG. 3, a press-molding apparatus shown therein comprises a hydraulic press including a bench 32, a plurality of parallel columns 33 extending upright from a bench 32, a support block 34 mounted on tops of the respective columns 33, a hydraulic cylinder 35 mounted on the support block 34 and drivingly coupled with a movable platen 50 situated below the undersurface of the support block 34 opposite to the cylinder 35, and a fixed platen 36 fixedly mounted on the bench 32 in face-to-face relation to and immediately below the movable platen 50. The hydraulic cylinder 35 is fluid-connected with a fluid control circuit (not shown) of a design known to those skilled in the art.

As shown, the fixed platen 36 has a generally cylindrical solid table 37 rigidly mounted thereon, or formed integral therewith, and protruding upwards therefrom towards the movable platen 50 which has a cylindrical mold or rammer 25 rigidly secured thereto, or formed integrally therewith, for movement together with the movable platen 50. So far described, the cylinder 35 is operable to drive the movable platen 50 and, hence, the rammer 25, in a direction towards and away from the table 37, the table 37 being used to support thereon a lower mold 19 having a molding cavity 23 defined therein.

The apparatus also comprises a generally rectangular vacuum box 38 constituted by top and bottom wall members, a pair of opposed side wall members and front and rear wall members all assembled together, the front wall member having a lateral access opening defined therein and adapted to be selectively opened and closed by an access door 44. As a matter of design, one or both of the front wall member of the box 38 and the access door 44 have a gasket 45 disposed thereat exteriorly of the access opening in the front wall member for hermetically sealing the box 38 when the access door closes the access opening. The top wall member of the box 38 has an opening defined therein for the passage of the rammer 25 therethrough into the interior of the box 38 by way of a ring-shaped gasket 47, whereas the bottom wall member of the same box 38 has an opening for the passage of the table 37 therethrough by way of a ring-shaped gasket 46 with the lower mold 19 on the table 37 consequently positioned inside the box 38. It is to be noted that, in a simplified form of apparatus, the top surface of the fixed platen 36 or the bench 32 may form the bottom of the box 38, in which case the mold 19 may be fixedly placed directly on the platen 36 or the bench 32.

One of the wall members of the box 38, for example, the top wall member, has a nipple 49 rigidly and gastightly secured thereto in communication with the interior of the box 38, which nipple 49 is fluid-connected to a source of vacuum (not shown), for example, a vacuum pump, through a tube or piping 48. Thus, it will readily be understood that, when the vacuum pump is operated while the access opening is closed by the access door 44, the interior of the box 38 can be evacuated to a substantial vacuum.

Figure 4:
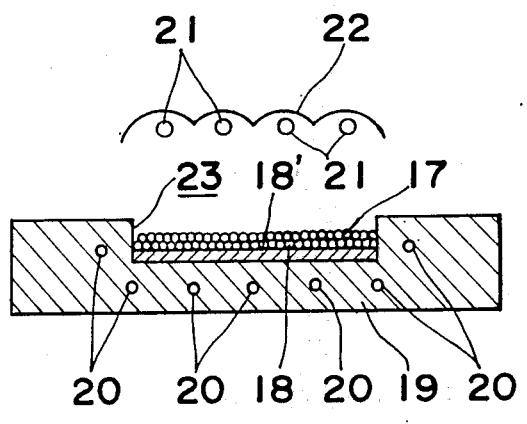
FIGS. 4 and 5 are sectional views, on an enlarged scale, of a portion of a mold assembly in the apparatus of FIG. 3, showing the sequence of press-molding of an information carrier disc.

Within the vacuum box 38, a heating unit comprising a generally box-like heater support 41 supporting one or more tubular infrared heaters 21 and also a generally corrugated reflector shade 22 is disposed for movement between an inoperative position, as shown in FIG. 3, and an operative heating position as shown in FIG. 4. More specifically, the heater support 41 is mounted on an endless chain 40 drivingly trained between idler and drive sprocket wheels 39, the idler and drive sprocket wheels 39 being spaced apart from each other and rotatably supported within the box 38 in any suitable manner. The drive sprocket wheel 39 is adapted to be driven by a reversible electric motor 53 also accommodated within the box 38. The supply of electric power to both the heaters 21 and the motor 53 is effected by means of a power supply cord 43 coupled with an electric coupler 42 rigidly and gas-tightly secured to one of the wall members, for example, the rear wall member, of the box 38.

Figure 5:
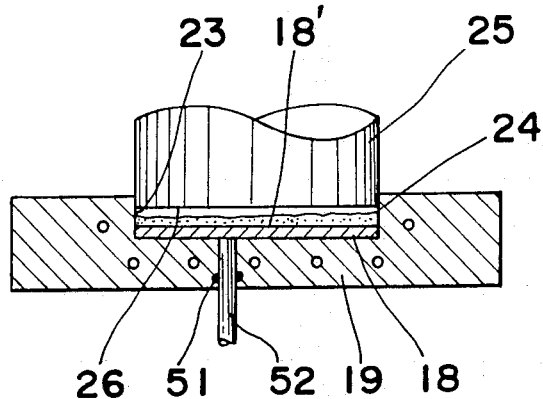

The lower mold 19 having the molding cavity 23 defined therein preferably has one or more continuous conduits 20 defined therein for the alternately switched passage of either hot water or cold water for heating and cooling the mold 19 respectively. As will be described later, the hot water is allowed to flow through the conduits 20 to facilitate the heating of the mold 19 thereby to assist the plasticizing of a transparent resin material 17 when the heater support 41 is brought to the operative position immediately above the molding cavity 23, whereas the cold water is allowed to flow through the conduits 20 to cool the mold to facilitate the cooling of an as-molded disc within the molding cavity 23 after the press-molding. As best shown in FIG. 5, a knockout pin 52 extends through the lower mold 19 from below by way of a ring-shaped gasket 51, it being understood that the knockout pin 52 is axially slidable between a retracted position, as shown in FIG. 5 in which the free end face thereof is flush with the bottom of the molding cavity 23, and an ejecting position at which the as-molded disc can be removed out of the molding cavity 23 as will be described later.

In the construction described above, a transparent synthetic material 17 is filled within the molding cavity 23 with a templet or template 18 placed between the transparent synthetic material 17 and the bottom of the molding cavity 23, while the access door 44 is opened. At this time, the rammer 25 is held at a raised position as shown in FIG. 3, and the heater support 41 is held at the inoperative position. After the loading of the synthetic material 17 in the molding cavity 23, and the access door 44 has been closed, the interior of the box 38 is evacuated to establish a vacuum therein. The heater support 41 is then moved by the motor 53 through the chain 40 from the inoperative position towards the operative position at which the heaters 21 are brought immediately above the molding cavity 23 and, hence, the synthetic material 17. The heaters 21 are thereafter energized to plasticize the synthetic material 17. During the heating of the synthetic material 17, hot water is circulated through the conduits 20 to keep the mold 19 heated.

After the plasticizing of the synthetic material 17, the heater support 41 is retracted from the operative position to the inoperative position and, then, the cylinder 35 is operated to drive the rammer 25 into the casting cavity 23 to press-mold the synthetic material to provide the as-molded information carrier disc having a signal groove transferred thereto from a surface 18' (FIGS. 4 and 5) of the templet 18.

The details of the process including the separation of the as-molded carrier disc from the templet 18 will now be described with particular reference to FIGS. 4 to 6.

FIG. 4 illustrates the condition in which a predetermined amount of transparent synthetic material 17 in the form of pellets or beads is placed over the templet 18 having a signal groove defined on the surface 18' thereof, which templet 18 has previously been placed within the molding cavity 23 in the mold 19 with the surface 18' facing upwards. The synthetic material 17 so placed over the templet 18 is applied with vibrations to make it form a layer of synthetic material of uniform thickness thereover.

FIG. 4 also illustrates the condition in which the heater support 41 and, hence, the heaters 21 are brought immediately above the molding cavity 23 containing the uniform layer of synthetic material 17. As hereinbefore described, the heating of the synthetic material 17 is carried out in the vacuum within the box 38 by energizing the heaters 21 and also by circulating hot water, preferably steam, through the waterways 20 in the mold 19. During the heating, the synthetic material 17 mainly absorbs heat, emitted by the infrared heaters 21, to plasticize it while the templet 18 is heated from below by heat of the mold 19 heated by the hot water or steam flowing through the conduits 20, and accordingly, the synthetic material 17 can be heated to a uniform temperature to plasticize it without radiating heat from the synthetic material 17 to the templet 18.

The transparent synthetic material is a granular thermoplastic resin including, for example, polymethacrylate, polycarbonate, polystyrene, polysulfone, polyethersulfone and polymethylpentene. This transparent synthetic material 17 may be employed in the form of pellets of 3 to 4 mm in size. However, for the synthetic material 17, the use of the pellets having a size of not greater than 2 mm, preferably 1 mm, which may be termed as "beads", is preferred so that the thickness of the layer of synthetic material within the molding cavity 23 can be rendered uniform for the ultimate purpose of avoiding both damage to the signal groove on the templet and any possible formation of flow markings during the press-molding of the information carrier disc having a thickness of 1 to 2 mm.

Thus, it will readily be seen that, since the heating of the synthetic material 17 is carried out within the box 38 then evacuated to establish the vacuum, there is no possibility of bubbles being included in the plasticized synthetic resin and, therefore, during the subsequent process step, the signal groove on the templet 18 can be faithfully transferred onto the as-molded carrier disc.

FIG. 5 illustrates the condition in which the plasticized synthetic resin, now identified by 24, is being press-molded with the rammer 25 lowered. Because of the nature of the information carrier disc, the end face 26 of the rammer 25 which is adapted to be brought into contact with the plasticized synthetic material 24 during the actual press-molding is made flat. Although not shown, the rammer 25 has defined therein a continuous conduit or conduits for the alternate passage of hot water and cold water, functioning in a manner similar to the conduits 20 in the mold 19.

It will be readily seen that, when the rammer 25 while heated by the flow of steam through the conduits defined therein is lowered so as to protrude into the molding cavity 23, the plasticized synthetic material 24 can be press-molded to form the as-molded information carrier disc with the signal groove transferred from the surface 18' of the templet 18. Simultaneously with or immediately after the actual press-molding with the heater support 41 having been moved to the inoperative position, the fluid flowing through the waterways in the rammer 25 and the mold 19 is switched over to the cold water thereby cooling the rammer 25 and the mold 19 to cool the as-molded disc carrier.

Subsequent to the cooling of the molded carrier disc, the rammer 25 is raised and the knockout pin 52 is moved to the ejecting position to facilitate the removal of the assembly of the as-molded disc and templet 18 out of the molding cavity 23.

The separation of the molded carrier disc, now identified by 28 in FIG. 6, from the templet 18 is carried out in the following manner.

Figure 6:
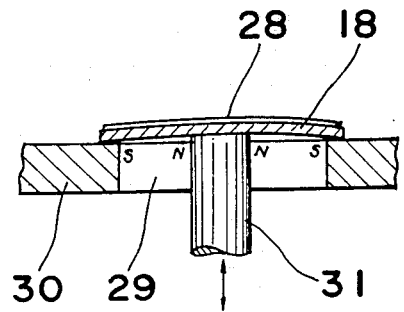
FIG. 6 is a side sectional view showing a method for separating the resultant carrier disc from a templet.

FIG. 6 schematically illustrates an essential portion of a separation unit used for separating the molded carrier disc 28 from the templet 18, which unit is separate from the press-molding apparatus shown in FIG. 3. It is to be noted that, for the purpose of the separator unit shown, the templet 18 is made of a magnetizeable material. As shown, the separator unit is in the form of an electromagnetic device and comprises a perforated S-pole plate 30 having an opening 29 defined therein of a diameter smaller than the templet 18, a generally cylindrical solid N-pole member 31 supported for movement between an operative and inoperative position in a direction concentric with the opening 29, an energizing coil (not shown) and a control circuit (not shown) for controlling the supply of electric power to the coil.

With the use of the separator unit of the construction described above, and after the assembly of the molded disc 28 and templet 18 has been placed over the S-pole plate 30 with its center aligned with the N-pole member 31 then held at the inoperative position, the coil is energized to develop the S and N polarities in the plate 30 and the member 31, respectively, while permitting the templet 18 to be magnetically attracted and retained on the plate 30, and the N-pole member 31 is then moved towards the operative position with its free end held in contact with and pressing the templet 18 to deform as shown. This is possible because the peripheral portion of the templet 18 is kept attracted magnetically by the plate 30. As the templet 18 is so deformed in a shape generally similar to a Belleville spring with the peripheral portion thereof magnetically attracted by the plate 30, the outer peripheral portion of the molded disc 28 tending to retain a flatness separates from the templet 18. The separation progresses from the periphery of the molded disc 28 towards the center thereof and the molded disc 28 finally completely separates from the templet 18.

Preferably, the separation is carried out also in a vacuum, i.e., within a separate box (not shown) evacuated to establish a vacuum within such separate box. Where the separation is performed in a vacuum, not only can a slight deformation of the templet 18 result in the complete separation between the templet 18 and the molded disc 28, but also any possible damage to the signal groove transferred to the molded disc, which would result from the relative slide between the templet 18 being deformed and the molded disc 28 tending to retain its flatness can be minimized or substantially eliminated. Moreover, the separation in the vacuum makes it possible to render the templet 18 to withstand against a greater number of deformation cycles than that in the atmosphere.

Although the present invention has been described in connection with the preferred embodiment with reference to the accompanying drawings, it is to be noted that various changes and modifications are apparent to those skilled in the art. By way of example, the reflector shade 22 may have any suitable coolng means for avoiding an undesirable excessive increase of the temperature thereof. Moreover, for heating the mold 19, either a heater or an electroinduction heating system may be used instead of the steam being passed through the conduits 20.

Furthermore, although the templet 18 has been described as having the signal groove formed on the surface 18' thereof, it may be formed on the flat end face 26 of the rammer 25 instead of the surface 18' of the templet 18. Alternatively, the templet 18 having the surface 18' formed with the signal groove may be magnetically secured to the end face 26 of the rammer 25 with the surface 18' facing towards the molding cavity 23, instead of being placed within the molding cavity 23.

Accordingly, such changes and modifications are to be understood as included within the true scope of the present invention as defined by the appended claims, unless they depart therefrom.

What is claimed is:

1. A press molding apparatus for making an information carrier disc comprising:
   a vacuum box having an access opening into an interior of said vacuum box and an access door for opening and closing said access opening;
   means connected to said vacuum box for evacuating the interior of said vacuum box and establishing a vacuum therein;
   a mold disposed in the interior of said vacuum box, said mold having a molding cavity defined therein for receipt of granular thermoplastic synthetic material which is heated and pressed to form an information carrier disc;
   a rammer disposed in the interior of said vacuum box, said rammer being movable into and out of said molding cavity of said mold for pressing heated thermoplastic synthetic material into a molded shape of an information carrier disc;
   means connected to said rammer for moving said rammer into and out of said molding cavity;
   infrared heating means movably mounted in the interior of said vacuum box, said infrared heating means being movable between a retracted position and a heating position, said infrared heating means facing said molding cavity in said heating position to heat thermoplastic synthetic material in said molding cavity and said infrared heating means located away from said molding cavity in said retracted position to allow said rammer to be moved into said cavity; and
   means connected to said infrared heating means for moving said infrared heating means between said retracted position and said heating position.

2. The press molding apparatus of claim 1, wherein said molding cavity has at least one signal groove formed on a surface of said molding cavity.

3. The press molding apparatus of claim 1, wherein a templet is disposed in said molding cavity, said templet having at least one signal groove on a surface thereof facing said rammer.

4. The press molding apparatus of claim 1, wherein a templet is disposed on said rammer, said templet having at least one signal groove formed on a surface thereof facing said molding cavity.

5. The press molding apparatus of claim 1, further comprising heating and cooling means disposed in said mold.

6. The press molding apparatus of claim 5, wherein said heating and cooling means comprises a plurality of conduits connected to a source of cold water and heated water or steam for selectively heating or cooling said mold.

7. The press molding apparatus of claim 1, wherein said means for moving said infrared heating means includes at least two spaced apart sprocket wheels, an endless chain mounted for rotation around said sprocket wheels and a reversible drive means connected to one of said sprocket wheels for moving said chain in opposite directions, said infrared heating means mounted on said endless chain for movement between said retracted and heating positions.

8. The press molding apparatus of claim 1, wherein said infrared heating means includes support means, infrared heaters mounted on said support means, reflector shield means mounted on said support means for reflecting heat towards said mold cavity and means connecting said infrared heaters to a power source.

9. A method of making an information carrier disc by use of a press molding apparatus which includes a vacuum box having an access opening into an interior of said vacuum box and an access door for opening and closing said access opening; means connected to said vacuum box for evacuating the interior of said vacuum box and establishing a vacuum therein; a mold disposed in the interior of said vacuum box, said mold having a molding cavity defined therein for receipt of granular thermoplastic synthetic material which is heated and pressed to form an information carrier disc; a rammer disposed in the interior of said vacuum box, said rammer being movable into and out of said molding cavity of said mold for pressing heated thermoplastic synthetic material into a molded shape of an information carrier disc; means connected to said rammer for moving said rammer into and out of said molding cavity; infrared heating means movably mounted in the interior of said vacuum box, said infrared heating means being movable between a retracted position and a heating position, said infrared heating means facing said molding cavity in said heating position to heat thermoplastic synthetic material in said molding cavity and said infrared heating means located away from said molding cavity in said retracted position to allow said rammer to be moved into said cavity; and means connected to said infrared heating means for moving said infrared heating means between said retracted position and said heating position, comprising:

placing a mass of granular thermoplastic synthetic material within the molding cavity;

evacuating the vacuum box to establish a vacuum within the vacuum box;

moving the infrared heating means to the heating position and energizing the infrared heating means to heat the mass of synthetic material to plasticize the synthetic material within the molding cavity while maintaining the vacuum within the vacuum box;

moving the infrared heating means to the retracted position after the synthetic material within the molding cavity has been plasticized;

driving the rammer from out of the molding cavity into an operative position within the molding cavity to compress the plasticized synthetic material; and allowing the compressed synthetic material to cool while the rammer is maintained at the operative position, thereby completing the information carrier disc.

* * * * *